Figure 1:
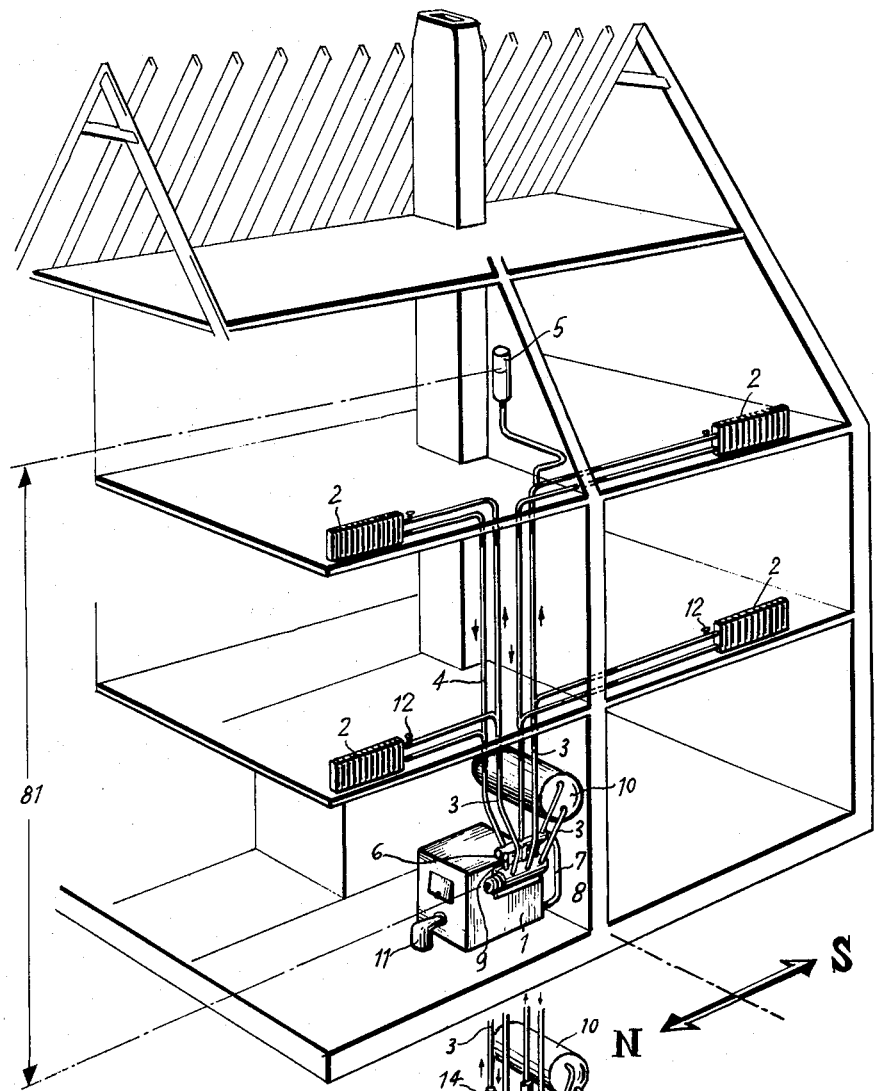

June 21, 1966 N. LAING ET AL 3,257,076
HEATING SYSTEM
Filed Oct. 9, 1963 6 Sheets-Sheet 1

INVENTOR
Nikolaus Laing
Hans Noack

BY

Michael J. Striker
ATTORNEY

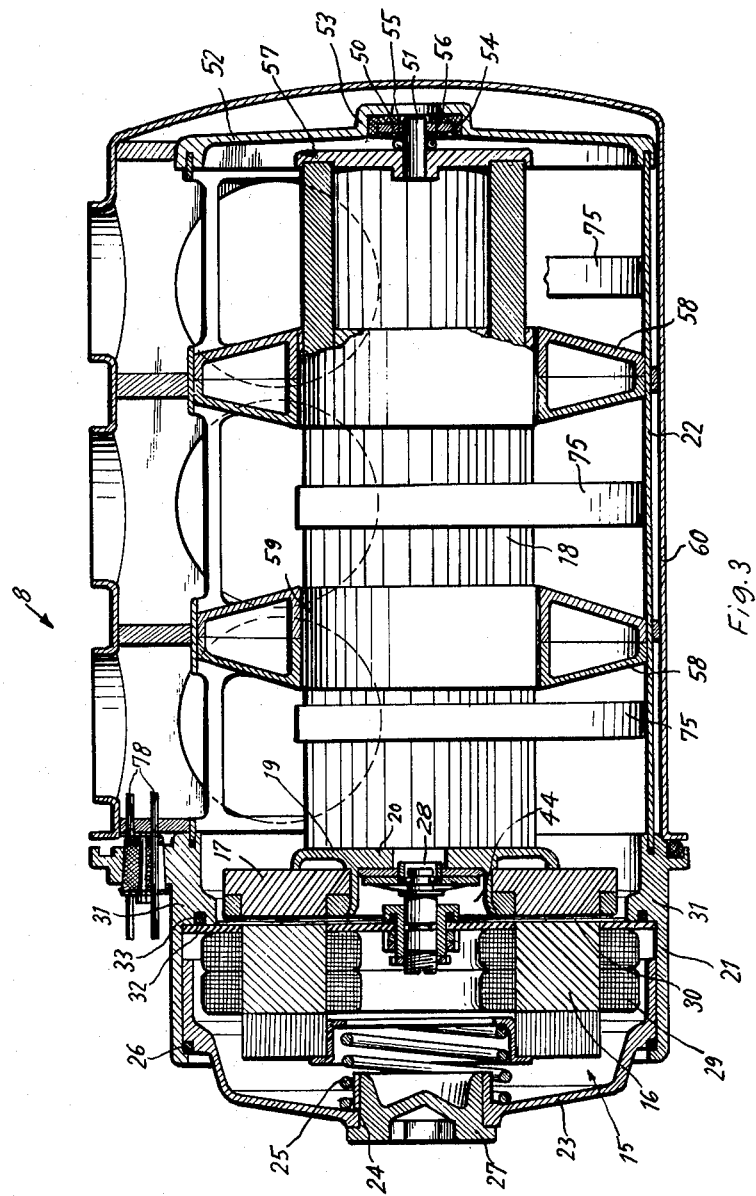

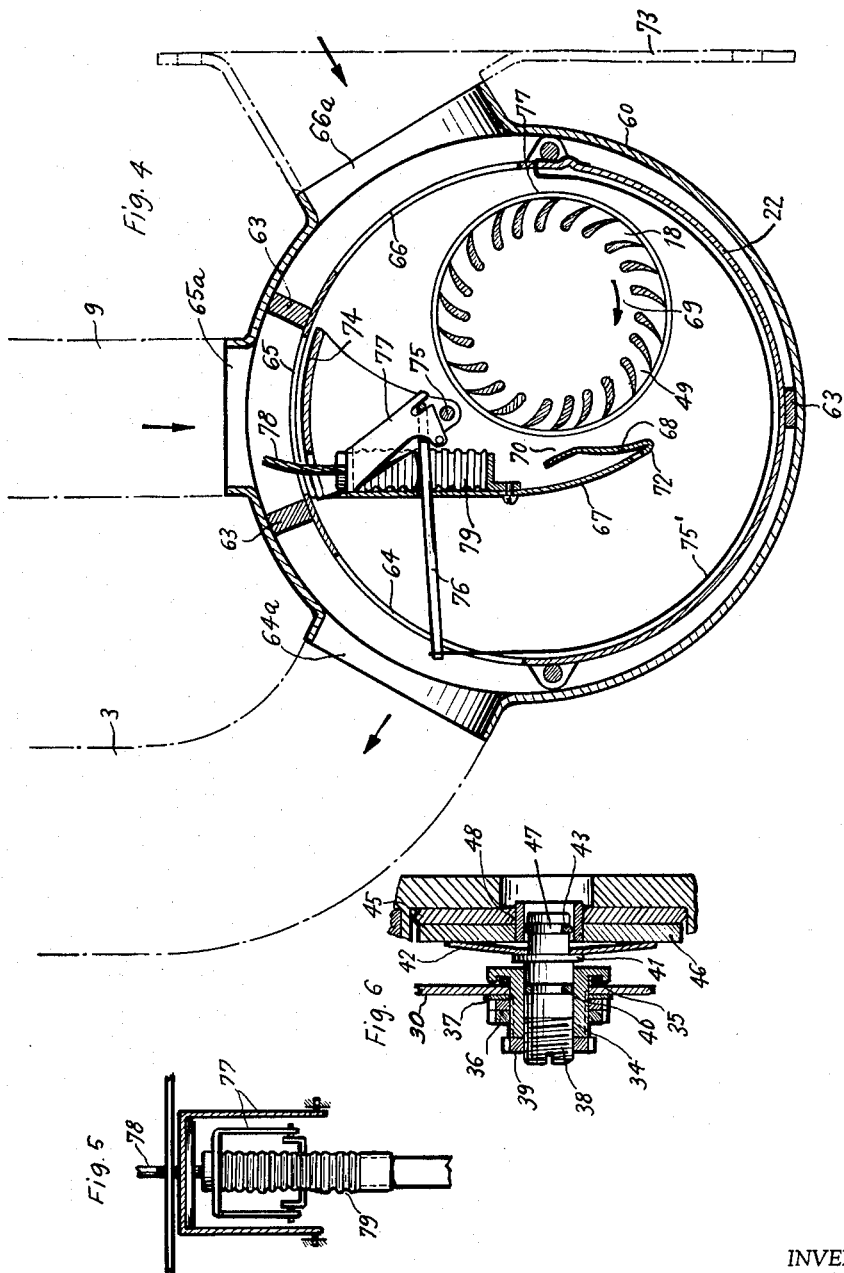

June 21, 1966  N. LAING ET AL  3,257,076
HEATING SYSTEM
Filed Oct. 9, 1963  6 Sheets-Sheet 4
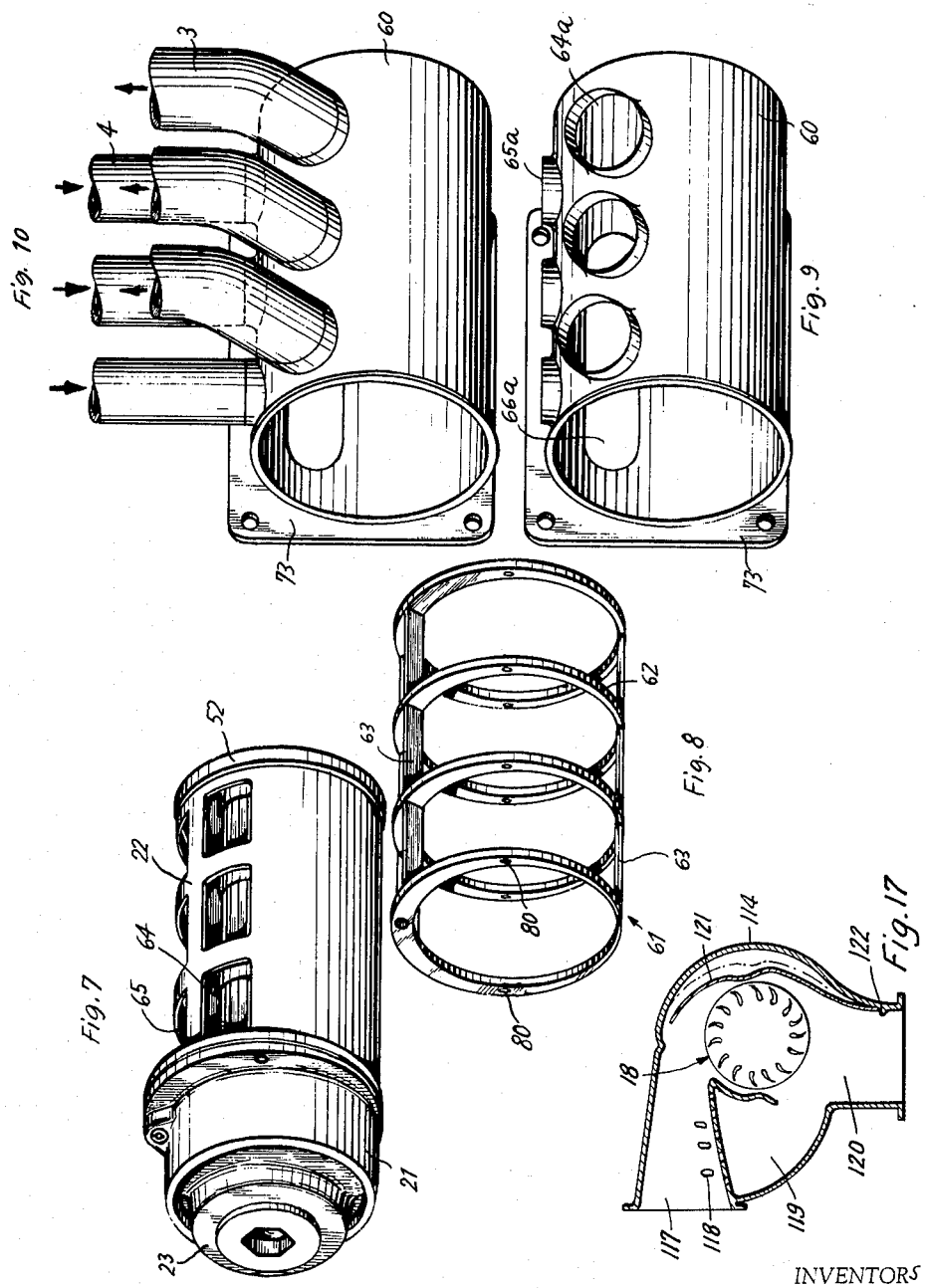
INVENTORS
Nikolaus Laing
Hans Noack
BY
Michael J. Striker
ATTORNEY INVENTORS
Nikolaus Laing
Hans Noack

BY

Michael J. Striker
ATTORNEY

United States Patent Office 3,257,076
Patented June 21, 1966

3,257,076
HEATING SYSTEM
Nikolaus Laing, Stuttgart, and Hans Noack, Cologne-Junkersdorf, Germany; said Noack assignor to said Laing
Filed Oct. 9, 1963, Ser. No. 314,964
Claims priority, application Germany, Nov. 3, 1959,
F 29,766
10 Claims. (Cl. 237—8)

This is a continuation-in-part of our application Serial No. 67,005, filed on November 3, 1960, and now abandoned.

The invention relates to a heating system with a heat source, heat exchangers for room heating and a system of pipes interconnecting these heat exchangers in which a heat carrier circulates influenced by a pump, incorporating at least two connected circuits in which the throughput of the heat carrier is in each case individually controllable.

Especially in the case of oil heating so-called mixing devices are generally in use which provide the high water temperature at the heating source, such as for instance in a boiler, and the lower water temperatures adapted to the room temperature in the heat exchangers which are conditions for economical operation. The supply temperature, i.e. the temperature of the heat carrier which leaves the boiler and is directed towards the heat exchangers has to be approximately 80° C., so that no sulphates condense from the exhaust gases. Without mixing control long intervals of non-operation alternating with periods of full heating performance would have to be taken into account.

In conventional systems mixing valve and circulating pump are delivered as separate units and mounted in the system during or after the assembly of the boiler. Apart from the complicated assembly and the correspondingly high wages factor this has the permanent disadvantage that the system as such becomes bigger on account of the separate position of mixing valve and circulating pump.

The conventional heat circulating pumps have the disadvantage that they require very narrow seals in order to achieve adequate efficiency. Thus they are susceptible to fouling, such as calcareous deposits, furthermore they behave badly when throttled, i.e. if the throughput is reduced by throttling, this results in substantially decreased efficiency. It is to be noted that in general the pump is continuously running as long as the system is in operation, while the individual radiators are controlled for instance by thermostatic valves. In extreme cases all radiators are closed, but the pump is still running at full power input, and in the case of axial pumps the power input may even increase, i.e. a substantial amount of electrical power is consumed quite unnecessarily.

The invention, however, provides a pump incorporating a blade cascade traversed by the flow in two opposite directions at right angles to the rotor axis in which the ends of the rotor are closed and the blades are bent forwardly in the direction of rotation; the geodetical level of the pump is selected in such a way that in case of a non-circulating heat carrier (i.e. switched-off pump) the static pressure in the suction area is higher than the dynamic pressure of the fluid moving at the peripheral speed at the inside of the blade cascade and the device controlling the throughput of the heat carrier in each circuit system is positioned at the point of intersection of the systems.

In this way it is possible to adapt the power input to the output for long periods of time, as in case of crossflow pumps the flow is admitted only to part of the rotor, while a part of the blade cascade coincides with a part of the nucleus of a potential vortex which is created when the rotor is in rotation, this vortex forming an immaterial lockout body for the working clearance between suction side and pressure side. This nuclear area varies in size dependent on the throttling stage, so that in critical cases, i.e. full throttling, it fills the whole rotor, so that no exchange of momentum is effected at the blades. This extremely favourable behaviour at the throttling stage which is achieved by no other kind of pump is most important for the invention. Furthermore the working clearance between suction side and pressure side, respectively between adjacent separated parts of one and the same rotor, may be comparatively large without reducing the efficiency. Thus the pumps which need practically no maintenance are not subject to disturbance by fouling.

The flow through the unit runs at right angles to the axis; the potential vortex forming in the interior space of the rotor which is closed at both ends supersedes the throughput and leads to a distribution of velocities which entails for part of the throughput an exchange of momentum at high velocities. It has become evident that the pressure coefficients of such pumps are substantially higher than those of conventional radial or axial pumps. Thus this kind of pumps may be run at very small peripheral speeds and a correspondingly low number of revolutions.

It is true that crossflow pumps are known; but hitherto they could not be used for heat circulation as they tended to cavitations entailing reduced efficiency and substantial noise. According to the invention this disadvantage may be overcome by mounting the pump for instance in the lower area of a pipe system, so that the suction area is subject to hydrostatic pressure, respectively to a static pressure produced in an equalizing receptacle under gas pressure, this static pressure being higher than the underpressure in the nucleus of the vortex.

In a heating system providing several heating circuits, for instance for the northern part of the building, for the southern part of the building and for hot water supply, hitherto three separate pumps and three mixing valves were required which had to be mounted individually in the pipes in a complicated working procedure. It serves our purpose that according to the invention now the pump and the control device for the rate of admixture, i.e. the distribution of the heat carrier to the individual circuit systems, may be combined in one unit which is connected in the first place to the heat source, in the second place to the return flow from the heat exchangers and in the third place to the supply towards the heat exchangers, the unit being fit for use for several parallel heat circuits each of which has supply and return flow provisions.

As the pump produces exclusively dynamic pressure at the periphery of the rotor, independent from the static presure created behind the diffusor the pressure distribution at the periphery of the rotor is maintained at the same level. Thus if several pumps incorporate the same rotor, adjacent circuits hardly disturb each other by axial secondary flow. In this way multiple flow pumps may be produced without providing for special seals between the individual stages.

In another embodiment the admixture controlling device, the pump and the boiler may be combined in one and the same unit; in this way expensive valves and special pump housings become superfluous. In this case the system becomes extremely compact.

The simplest possibility for construction of the mixing valve consists in designing the rearward section of the boiler in a way that it forms at the same time a housing for the mixing valve, and in positioning within this housing an elliptic plate mounted on a horizontal shaft at an angle of 45°. The heated water of the boiler enters the housing in front; the upper side is open towards the supply of the heating circuit, the back is open towards the return flow of the heating circuit, and at the bottom the returning water is led back to the boiler. The shaft supporting the elliptic plate traverses the whole boiler to its front part and goes through its front wall and is there equipped with a handle by which it may be rotated in order to adjust the valve opening.

This arrangement has the construction-technical advantage that individual housings for the mixing valve and the circulating pump become superfluous. Furthermore the pipe system is simplified, as a separate assembly of both units is no longer necessary.

In terms of fluid dynamics this has the advantage that the flow between mixing valve and circulating pump remains within one and the same plane. The deflections required up to now for transporting water to the circulating pump become unnecessary. The flow resistance is reduced. In terms of pyrometrics it is advantageous that the circulating pump in the boiler produces high water velocities and keeps them at the same level, thus entailing a high rate of heat transfer and making it possible that the lower regions of the boiler are protected against corrosion. In this way also the heat transfer surfaces and the boiler as a whole may be of reduced dimensions.

Besides by a special valve the rate of admixture may also be altered by changing the number of revolutions or the direction of rotation or the switch-on period of the pump rotor.

These and other objects, advantages and features of the invention will become apparent from the following description and drawing which are merely exemplary.

Figure 2:
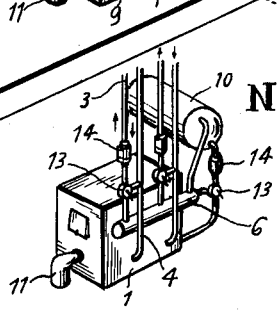
Figure 11:
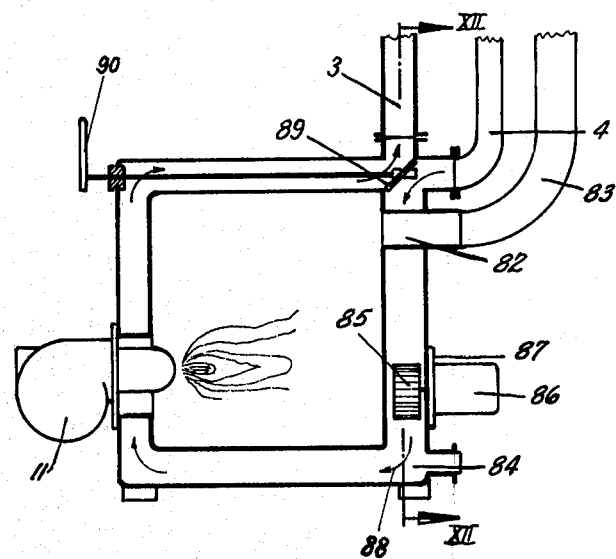
Figure 13:
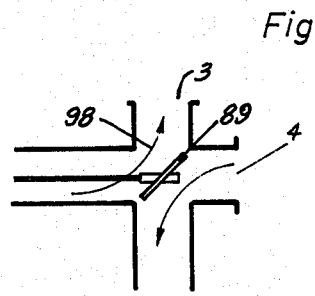
Figure 12:
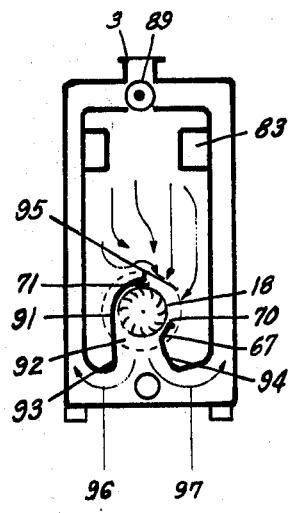
Figure 14:
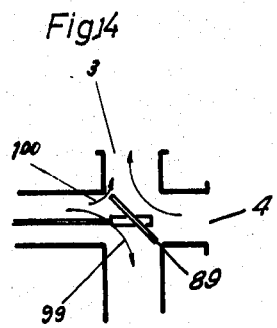
Figure 15:
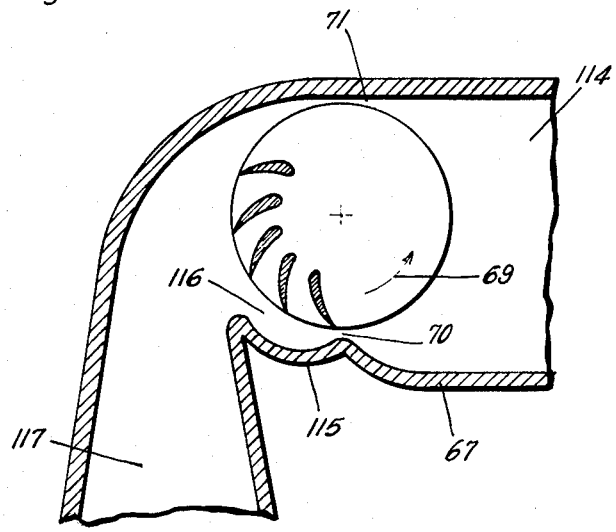
Figure 16:
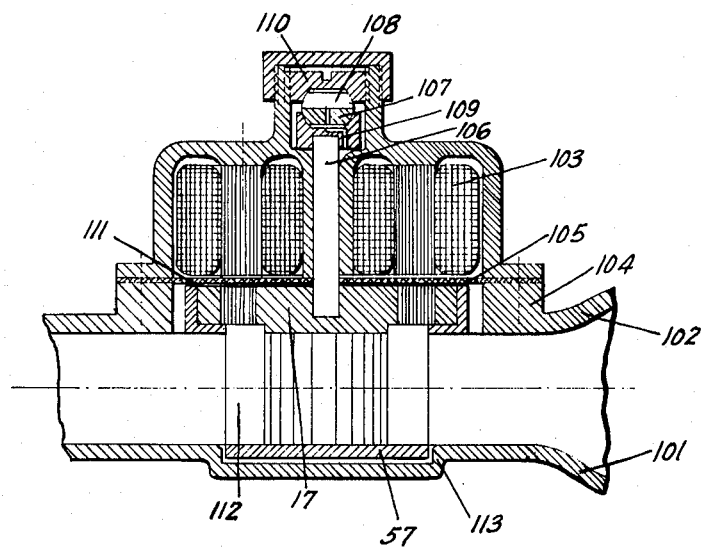

In the drawing:

FIG. 1 shows schematically in a perspective view a heating system built in a house, FIG. 2 shows the corresponding construction of conventional design, FIG. 3 shows a longitudinal section of a unit for several heating circuits, FIG. 4 shows a cross section of this, FIG. 5 shows an enlarged detail of the thermostatic control, FIG. 6 is a cross section of the bearings at the motor side, also enlarged, FIG. 7 is a perspective view of the combined motor and pump housing, FIG. 8 shows perspectively a separator between the distributor box and the pump housing, FIGS. 9 and 10 give a perspective view of the distributor box, FIG. 11 is a schematic diagram of the boiler of a second arrangement in section, FIG. 12 shows a cross section of the boiler described in FIG. 11 at the line XII—XII in FIG. 11, FIG. 13 shows a part section of the boiler with a control device in a first position, FIG. 14 shows the control device in a second position, FIG. 15 shows a cross section of a pump, FIG. 16 shows a section of a motor/pump unit, FIG. 17 is a schematic diagram of a special guide wall arrangement of the pump.

A building contains a heating system consisting of a heat source 1, for instance an oil-fired boiler, heat exchangers 2 and different heating circuits each of which has a supply 3 and a return flow 4. An equalisation receptacle 5 is mounted at the culminant point, the return flow pipes 4 open into a collector 6 from which a common pipe 7 leads to the lower part of the boiler 1 and enters it. The supply pipes 3 come from a unit 8 described in more detail in the following which is connected to the return flow pipes 4 opening into the collector 6 by means of intermediate ducts 9.

The embodiment shown in FIG. 1 provides three separate parallel heating circuits, one for the southern part of the building, one for the northern part of the building, and one for the hot water supply with the boiler 10. The boiler is fired by an oil burner 11; the individual heat exchangers may be switched on and off by means of valves 12.

Already a comparison with FIG. 2 makes evident what advantages are achieved by the invention. A conventional heating system of the same efficiency would require a separate mixing valve 13 and a special circulating pump 14 in the supply pipe, while according to the invention (see FIG. 1) solely the unit 8 has to be flanged at the boiler wall and the pipes have to be fitted. The unit 8 may be arranged as follows:

An electric motor 15 with a flat armature and axial poles consisting of a stator 16 and an armature 17 drives a pump rotor 18 whose one end 19 is connected with a flange 20 being firmly mounted at the armature 17. Alongside its periphery the motor 15 is surrounded by a housing part 21; in the same way the pump rotor 18 is surrounded by a pump housing 22 connected with the motor housing 21. The open front of the motor housing 21 is closed by a cover 23 which is shifted outwardly by means of a throat 24 surrounded by a spiral spring 25 and supports itself against a seal 26 at one edge of the motor housing 21. A plug 27 which may be screwed for instance in the center of the cover 23 allows for free access to the bearing 28 of the armature 17 respectively of the pump rotor 18.

The electric motor with its windings 29 in the motor housing 21 is separated from the pump housing 22 by a thin plate of fine steel 30 closing up with projecting parts 31 of the motor housing 21. A sheet steel ring 32 reaching to the stator 16 lies on the fine steel plate 30 for reinforcement. The fine steel plate is pressed towards the inlaid seal ring 33 by the spiral spring 25 supported by the cover 23 and the motor 15, so that adequate sealing is warranted.

A special design of the bearing is necessary in order to mount the long pump rotor 18 properly. This bearing includes a shell 34 which bears at its end facing the pump rotor 18 a groove containing a seal ring 35. The shell 34 bears an outside screw thread on which the check nuts 36 may be screwed. After the shell 34 has been introduced into a borehole in the fine steel plate 30, the check nuts are screwed on the shell and clamped at a washer 37 so that the shell 34 is pressed firmly against the fine steel plate 30. The borehole of the shell 34 contains a screwed-in pivot 38 which in turn is fixed in its axial position by means of a check nut 39. For sealing purposes a rubber ring 40 is set in a groove of the pivot. The pivot 38 bears a collar 41 supporting a cup spring 42; not far from its free end is a second groove for an elastic cord 43.

The flange 20 connected with the armature 17 has a recess 44 in whose bottom a carbon plate 45 is glued. This carbon plate represents the actual sliding element, for its front side rests against a disk 46 whose center is soldered with a projecting part 47 of the shell. Thus the carbon plate 45 slides at the front side of the disk 46 and at the same time centers the pump rotor 18 at the projecting part of the shell 47 from which it is separated by a narrow air clearing 48 allowing for small movements of the rotor, so that the projecting part of the shell 47 lying on the rubber O-ring 43 may be inclined to a limited extent.

Various production procedures for the pump rotor 18 are possible. It may for instance be produced by injection molding; the blade cascade may also consist of sheet metal strips. The blades in question are concave in the direction of rotation and are preferably profiled, the thicker end of the profile facing the internal space of the rotor. The rotor 18 may also consist of hot-water resistant plastics. The mounting of the other end of the rotor 18 may also be effected in a purposeful manner by means of a carbon plate 50 set on a shaft end 51. A cover 52 closing the pump housing 22 bears in its center a recess 53 containing a rubber sleeve 54. The coal plate 50 lies axially on this rubber sleeve; at the other side an inlaid plate 55 and a rubber O-ring 56 maintain the axial clearance towards the end part 57 of the pump rotor 18.

Now the unit 8 shown in FIG. 3 provides for three independent heat circuits arranged parallel to one another. The pump rotor 18 is therefore a component part of three pumps. In order to achieve this aim the pump housing 22 is subdivided into three chambers by means of conically formed separation rings 58. These separation rings 58 have a comparatively large working clearance towards the rotor 18. As it is easily to be seen from FIG. 4 the electric motor 15 respectively the pump rotor 18 are mounted eccentrically in the pump housing 22. Furthermore the pump housing 22 is surrounded by a distributor box 60 which, in turn, is also mounted eccentrically with reference to the pump housing 22. The fixing of the distributor box 60 at the pump housing 22 is effected by a separator 61 shown specially in FIG. 8 which consists of individual seal rings 62 interconnected by longitudinal straps 63. The intervals between the individual seal rings in a longitudinal direction are selected in a way that they correspond in each case to the length of one chamber of the pump housing 22. Now the distributor box 60 and the pump housing 22 in each case show three perforations 64, 65, 66 respectively 64a, 65a, 66a through which the heat carrier can be moved. In this for instance the perforation 66a may have the form of a slit. The eccentric position of the pump rotor 18 in the pump housing 22 has the advantage that the wall of the pump housing 22 represents at the same time a guide wall for the crossflow pump. The second guide wall is fastened at the pump housing and consists for instance of a piece of sheet steel 67 with a guide-wall 68 separating the pressure side from the suction side seen in the direction of rotation; in this it is to be noted that the direction of rotation of the pump rotor 18 in FIG. 4 is clockwise as shown by the arrow 69. Thus the said guide wall 68 is set at a radial distance from the rotor 18 which tapers in the direction of rotation of the rotor 18. The suction area of the pump rotor 18 extends from the narrowest gap 70 of the guide-wall 68 to the narrowest gap of the wall of the pump housing 22 outside the guide walls, while the outlet corresponds to an area reaching from the tip 72 of the said guide-wall 68 to the wall of the pump housing 22.

The openings 65, 66 respectively 65a, 66a are positioned in a way that they are within the suction area of the pump. In this the nozzle of the perforation 66a communicates with the interior space of the boiler, while the nozzle of the perforation 65a is connected to the return flow 4 respectively the intermediate ducts 9.

The supply 3 is connected to the nozzle of the perforation 64a which is positioned at the pressure side of the pump rotor. A flange plate 73 may be welded over the perforations 66a at the distributor box 60, so that the whole unit may be screwed quite simply at the outside of the boiler housing, i.e. at the upper end of the boiler.

Now the pump housing 22 contains a control flap 74 pivotable around the axis of a shaft 75. This control flap may close the perforation 65 at the pump housing so that no heat carrier may enter there. The position of this flap 74 may be subject to thermostatic control; in this case a bimetallic strip 75' runs alongside part of the interior wall of the pump housing. One end of the bimetallic strip is firmly connected to the wall of the housing, while its free end links up with a traverse 76. This traverse moves a system of levers 77 which induces a movement of the flap 74 as soon as the bimetallic strip 75' is bent. In this the bimetallic strip may be subject to an initial stress for instance by a duct 78 and a siphon 79, so that the control of the flap 74 may be regulated.

The motor housing, the pump housing and the distributor box may be fixed together by spacer bolts not shown in detail which penetrate through the openings in the seal rings 62 of the separator 61. In this case the distributor 60 may simply be a deep-drawn pot which is quite simply set over the outer periphery of the separator 61 after this separator has been pushed on the pump housing.

The unit works quite simply as follows:

At first it is a pre-condition that all circuits are filled with the heat carrier. After the motor 15 has been switched on, the pump presses the heat carrier through the perforation 64 respectively 64a to the supply 3 which runs to the heat exchangers 2 and returns from them in the return flow pipe 4 to the collector 6. If the control flap 74 is closed, the whole of the return flow returns via the common pipe 7 to the boiler, and the pipe 7 enters the boiler at its lower end. This circuit takes place for instance in case of very low free air temperatures or when operation of the system is started; this working stage therefore corresponds to the maximum capacity of the boiler. If less heat is required, the control device over the duct 78 is set in a way that the bimetallic strip 75' influenced by the temperature of the circulating liquid at the pressure side may bend and thus pivot the control flap 74 so that the aperture 65 is opened. In this moment cool fluid from the return flow 4 will enter the pump housing, so that the cool liquid mixes with the hot liquid from the boiler. In this case the rate of admixture depends on the position of the control flap 74 which may be shifted to an extent that almost the whole of the suction area of the rotor 18 is fed by the return flow liquid. This creates a special boiler circuit which is almost completely separated from the remaining circuit of the heat carrier.

This results in the advantages described before, i.e. the boiler may always be operated at the right temperature and no detrimetal condensates settle in the exhaust.

For a satisfactory functioning of the pump it is only necessary that the geodetical level reaches a certain extent which allows for a pressure at the suction side of the rotor corresponding to the dynamic pressure of the liquid moving with the peripheral speed of the inner blade edges.

In another embodiment shown in FIGS. 11 to 17 the system may look as follows:

The oil burner 11 is positioned at the front wall of a central heating boiler; smoke gases enter a chimney 83 through openings 82. A rear part 84 forms at the same time the housing for a pump 85 driven by a motor 86. The diameter of the pump rotor is selected in a way that it may be brought through an opening in the boiler wall belonging to a flange 87. The pump 85 transports the heat carrier as per the arrows 88 and thus effects circulation of the water in the boiler. The return flow 4 is set at right angles to the supply 3. At the point of intersection of the two duct axes there is a rotary slide valve 89 which may be moved by a control member 90. In the position shown by the drawings practically the whole throughput enters the supply pipe.

FIG. 12 shows the housing of the pump 85 which consists of a guide wall 91 which even at the narrowest point 71 is sufficiently spaced from the rotor of the pump 85 that congestion is avoided; then the guide wall forms together with the rotor a diverging channel 92 and finally continues in a diffuser wall 93. The other guide wall 67, in turn, forms together with the rotor another gap 70 which widens in the direction of rotation and also continues in a diffusor wall 94. Once more the suction is effected within the area 95; the flow divides behind the diffusor as per the arrows 96 and 97; the wall which is postioned at right angles to it has a distance of about half the outlet width of the diffusor.

Now the admixture rate is controllable by the position of the valve disk 89. FIG. 13 shows a final position in which the whole throughput coming from the return flow 4 is pressed through the boiler and following the arrow 98 flows through the supply pipe 3 once more to the heat exchangers. FIG. 14 shows another final position of the disk 89; in this case almost the total quantity of the fluid moved by the pump 85 is circulated within the boiler following the arrow 99, and only a very small percentage flows to the supply 3 following the arrow 100. The supply 3 is almost directly connected with the return flow 4.

Also in this case the drive may be effected by a motor with a flat armature and axial poles. The pump housing is formed by two walls 101 and 102 of the water jacket of the boiler. The motor 103 has a flange 104. The interior space of the motor and the interior space of the circuit which is filled with water is effected by a nonmagnetic disk 105 which preferably is set within the flange plane. The shaft 106 has water lubrication; half of the cup 107 and 108 forms a bearing for the axial pressure. Water is directed through a channel 109 to the center, so that the real sliding surface has water lubrication.

An adjusting screw serves for an initial setting of the air gap 111. Once more the rotor of the pump 112 is closed at both axial ends and is combined with the armature 17 in one and the same component. Preferably the end plate 57 protrudes into a recess 113 of the side wall 101.

The section of FIG. 15 shows that the rotor rotating in the direction of the arrow 69 is equipped with blades bent in the direction of rotation. A gap 71 is formed between the rotor periphery and the guide wall 114, another gap 70 appears between the guide wall 67 and the rotor periphery. The construction of the following area 115 is of substantial importance; towards the inside this area shows a circle-like outline, and the distance 116 is larger than the width of the gap 70.

In the embodiment shown in FIG. 17 the diffusor 117 is perforated. The apertures 118 are connected to the suction area 120 by a channel 119. At the same time this figure shows a special construction of the housing which prevents a blocking of the pump. For this purpose the wall 121 limiting the rotor is made of spring steel sheet metal, which is fastened at the wall 114 at 122. As soon as large solid particles, such as for instance boiler scale, get into the pump the spring leaf 121 may recede to the wall 114, so that even large particles may pass through the pump.

We claim:

1. In a heating system, boiler means; a heat exchanger; a supply line for delivering fluid to said heat exchanger; return conduit means for conveying fluid from said heat exchanger; and a control unit connecting said boiler means with said supply line and with said return conduit means, said unit comprising a control device for regulating the flow of fluid from said return conduit means to said boiler means and to said suply line so that the supply line may receiver fluid from at least one of said means, said unit further comprising a crossflow pump for circulating the fluid and said pump comprising a rotor provided with closed ends and having suction and discharge areas and elongated blades which in cross section are curved in direction of fluid flow through the rotor, said suction line and said return conduit means extending upwardly from said pump to an elevation sufficient to provide at said suction area a static pressure greater than the dynamic pressure in the interior of said rotor.

2. A structure as set forth in claim 1, wherein said unit further comprises an electric motor having a rotary portion coupled with the rotor of said pump, interconnected housings for said motor and said pump, and covers sealingly secured to the ends of said housings.

3. A structure as set forth in claim 2, wherein said rotor and said motor housing are eccentric with reference to said pump housing.

4. A structure as set forth in claim 3, wherein said unit further comprises a distributor box eccentrically accommodating said pump housing.

5. A structure as set forth in claim 2, wherein said heat exchanger comprises a plurality of individual heat exchanger elements and wherein said supply line and said return conduit means respectively comprise a plurality of conduits each connected with one of said elements, said unit further comprising partitioning means subdividing the interior of said pump housing into a plurality of chambers each connected with a supply conduit and with a return conduit, said partitioning means surrounding the pump rotor with substantial clearance.

6. A structure as set forth in claim 1, further comprising thermostat means for adjusting said control device.

7. A structure as set forth in claim 6, wherein said pump comprises a housing and said thermostat means comprises a bimetallic element provided in said housing and operatively connected with said control device.

8. A structure as set forth in claim 6, further comprising means for adjusting the initial position of said thermostat means.

9. In a heating system, in combination, crossflow pump means having an elongated rotor provided with closed ends and with elongated axially extending blades distributed about the axis of said rotor and each having in cross section a curvature directed in the direction and rotation of said rotor, said pump means further having a suction area, a discharge area, a diffuser, and a wall separating the suction and discharge areas and forming part of said diffuser, said wall being formed with perforations; and a network of pipes communicating with and extending upwardly from said pump means for circulating a heating medium through the heating system, said network of pipes extending upwardly from said pump means to a height sufficient to provide at said suction area a static pressure greater than the dynamic pressure in the interior of said rotor.

10. In a heating system, in combination, crossflow pump means having an elongated rotor provided with closed ends and with elongated axially extending blades distributed about the axis of said rotor and each having in cross section a curvature directed in the direction of rotation of said rotor, said pump means having a suction area, a discharge area, and a wall extending approximately tangentially with respect to said rotor and made of an elastic yieldable material for receding in a radial direction; and a network of pipes communicating with and extending upwardly from said pump means for circulating a heating medium through the heating system, said network of pipes extending upwardly from said pump means to a height sufficient to provide at said suction area a pressure greater than the dynamic pressure in the interior of said rotor.

References Cited by the Examiner

UNITED STATES PATENTS

| 2,081,831 | 5/1937 | Moore | 237—63 |
| 2,358,809 | 9/1944 | Jennings | 237—8 |
| 2,462,217 | 2/1949 | Oaks | 236—99 |
| 2,504,491 | 4/1950 | Broderick | 237—8 |
| 2,514,718 | 7/1950 | Oaks | 237—8 X |
| 2,626,107 | 1/1953 | Rollins | 237—63 |
| 2,965,284 | 12/1960 | Coester | 230—45 |
| 2,968,436 | 1/1961 | Coester | 230—125 |

FOREIGN PATENTS

| 291,007 | 8/1928 | Great Britain. |
| 757,543 | 9/1956 | Great Britain. |

EDWARD J. MICHAEL, *Primary Examiner.*

V. M. PERUZZI, M. L. BATES, *Assistant Examiners.*